United States Patent
Burckart et al.

(10) Patent No.: US 9,514,237 B2
(45) Date of Patent: ***Dec. 6, 2016

(54) MULTI-SOURCE ELECTRONIC FORMS WITH CONCEALED FIELDS

(75) Inventors: Erik John Burckart, Raleigh, NC (US); Curtiss James Howard, Cary, NC (US); Andrew Ivory, Wake Forest, NC (US); Aaron Kyle Shook, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,092

(22) Filed: Mar. 9, 2012

(65) Prior Publication Data
US 2012/0173990 A1 Jul. 5, 2012

Related U.S. Application Data

(63) Continuation of application No. 12/820,051, filed on Jun. 21, 2010.

(51) Int. Cl.
*G06F 17/30* (2006.01)
*G06F 17/24* (2006.01)

(52) U.S. Cl.
CPC ......... *G06F 17/3089* (2013.01); *G06F 17/243* (2013.01)

(58) Field of Classification Search
CPC .................. G06F 17/3089; G06F 17/243
See application file for complete search history.

(56) References Cited

U.S. PATENT DOCUMENTS

| | | |
|---|---|---|
| 5,315,504 A | 5/1994 | Lemble |
| 6,199,079 B1 | 3/2001 | Gupta |
| 6,463,461 B1 | 10/2002 | Hanson et al. |
| 6,589,290 B1 | 7/2003 | Maxwell et al. |
| 6,643,624 B2 | 11/2003 | Philippe et al. |
| 6,876,977 B1 | 4/2005 | Marks |
| 6,981,028 B1 | 12/2005 | Rawat et al. |
| 7,305,439 B2 | 12/2007 | Qian et al. |
| 7,500,178 B1 | 3/2009 | O'Donnell |
| 7,930,411 B1 | 4/2011 | Hayward |
| 2003/0028792 A1 | 2/2003 | Plow et al. |
| 2004/0024842 A1* | 2/2004 | Witt ............................... 709/219 |
| 2004/0075686 A1* | 4/2004 | Watler et al. .................. 345/749 |
| 2005/0028084 A1* | 2/2005 | Dziejma ....................... 715/505 |
| 2005/0210263 A1* | 9/2005 | Levas et al. ................... 713/182 |

(Continued)

OTHER PUBLICATIONS

S. Jacobs et al.,Filling HTML forms simultaneously:CoWeb-Architecture Functionality,5th Intnl WWW Conf, http://www.webcitation.org/5kss5Zlag,Oct. 29, 2009, Elsevier, Netherlands.

*Primary Examiner* — Mohammad S Rostami
(74) *Attorney, Agent, or Firm* — Grasso PLLC

(57) ABSTRACT

Electronic multi-user forms are provided. The use of these forms may include displaying the forms to more than one user, receiving population data from one or more user, and selectively displaying the population data to each user. The population data may be displayed to the various users based on the security authorization of the user seeing the form. Upon completion of the form by the users, the form may be further completed and submitted for processing or approval.

15 Claims, 5 Drawing Sheets

(56) References Cited

U.S. PATENT DOCUMENTS

| | | |
|---|---|---|
| 2008/0059208 A1 | 3/2008 | Rockfeller et al. |
| 2008/0091780 A1 | 4/2008 | Balan et al. |
| 2008/0141117 A1 | 6/2008 | King et al. |
| 2008/0215976 A1* | 9/2008 | Bierner et al. .............. 715/708 |
| 2010/0131584 A1* | 5/2010 | Johnson .................... 709/203 |
| 2010/0217682 A1* | 8/2010 | Chan ......................... 705/26 |
| 2011/0022419 A1* | 1/2011 | Ziade et al. .................. 705/4 |
| 2011/0219077 A1 | 9/2011 | Burckart et al. |
| 2011/0225485 A1* | 9/2011 | Schnitt ...................... 715/222 |

\* cited by examiner

MULTI-SOURCE ELECTRONIC FORMS WITH CONCEALED FIELDS

BACKGROUND

The present invention relates to the population and concealment of user data in multi-user input environments. More particularly, methods, system, apparatus, and articles of manufacture are provided wherein fields are populated with user data and the user data is selectively concealed from various users before, during or after population.

Users complete and submit electronic forms in various applications and using various systems—both local and networked. Forms in these applications and systems include fields populated by the user, with user data: the user's name, address, or other particulars. These fields may be populated in order to purchase products from a retailer, to arrange for payment and delivery of packages, and for other reasons as well. User data provided in one or more of the fields may be confidential or personal and may contain sensitive information. This may include the user's social security number, credit card number, and a personal identification number attributed to the user and known to only a few. Upon completion of the form, a user may submit the form in order to obtain the desired product, service or result.

BRIEF SUMMARY

Methods, apparatus, and articles of manufacture are included in embodiments of the invention. These embodiments can include the presentation of multi-user forms to more than one user, where each of the users is participating in the completion of the form. Data submitted by each user and used to populate fields of the form may be shielded from other users. This shielding may depend upon the confidential authorization the viewing user has. Prior to submission, the data from multiple users may be gathered and combined in real-time, using stored data, and various other methods, in order to populate and complete the form. Once the form is completed, it may be submitted for further processing or authorization or for other reasons as well.

For example, in embodiments, a non-volatile computer readable medium may be provided. This medium may store instructions for managing the completion of an electronic form by more than one user. These instructions, when executed, may cause a processor to display a multi-user form to a first user, the multi-user form having a plurality of fields, with some of the fields having a first confidentiality designation and some of the fields having a second confidentiality designation. The instructions may also cause the processor to receive population data for one or more fields from a first user, populate one or more fields using the received first user population data, and determine if a populated field has the first confidentiality designation or a different confidentiality designation. Based on the determination, fields may be displayed to a second user after determining if the second user has authority to access the populated fields having the determined confidentiality designation.

The instructions may also include: identifying the authority of a user to access confidential designations of a first user; identifying the authority of a first user to access confidential designation of a second user; gathering data from multiple users in order to populate fields of the form; and submitting the form for further processing or authorization.

These and other embodiments of the invention are possible, as provided and explained herein.

DETAILED DESCRIPTION

Figure 1:
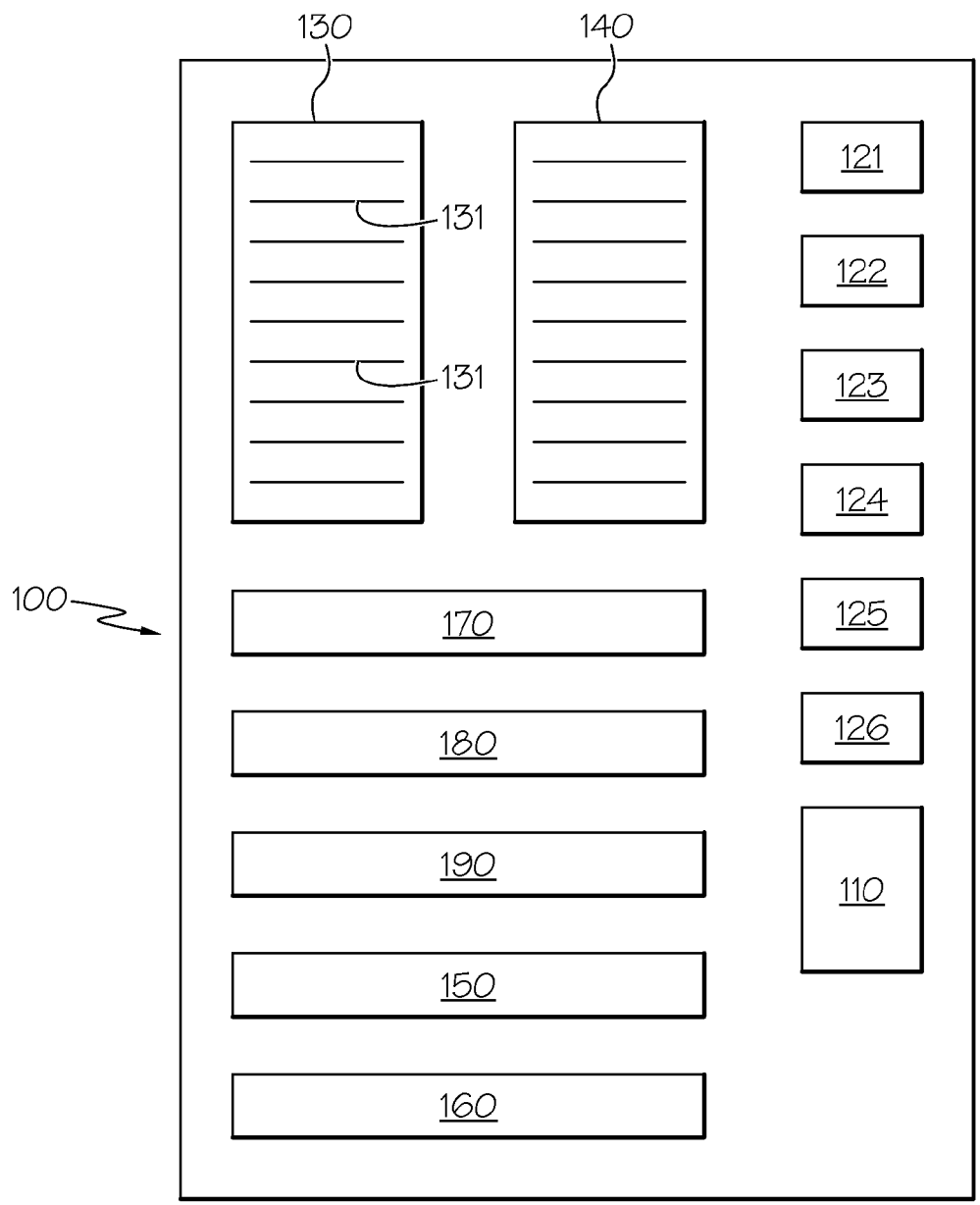
FIG. 1 shows a form, including fields that may be populated and concealed, in accord with embodiments.

Embodiments include systems, methods, apparatus, and articles of manufacture that serve to populate one or more fields with data from several sources, where the populated data may not be available to one or more users. Thus, more than one user may contribute data to an electronic form and when the data is considered to be or designated as confidential or personal, this confidential or personal data may be concealed from other users who are also completing the form. The confidential data may also be concealed from subsequent users of the electronic form—for example from a downstream quality reviewer as well as from someone seeking to authorize an action predicated on the completed electronic form. In other words, the concealment of certain populated fields may continue through approval and submission of the electronic forms.

In embodiments, when forms populated by two users are being created, each user may take care to fill in certain fields of the electronic form such that the form may not be populated by a single user. When the users are finished collaboratively filling out the fields, the form may be submitted to a specialized server resource (e.g., a servlet, JSP, JVM, ASP, etc) designed to process these multi-source forms with concealed fields. These server resources may use session information to process the multi-source forms and may complete the population of the forms using received data and session information regarding the identified users or contemporaneously received from the users.

In embodiments, the fields need not be populated at the same time and the fields may be populated by different classes of users. For example, a customer may populate certain fields and a customer service agent may populate others. A database may also be queried at various times to populate certain fields. The database may store confidential information for certain users and may seek to confirm the levels of authority associated with these users to view information. In embodiments, populated fields may be concealed from users designated with a certain inadequate security level and from all users other than the user who provided the information. Other security schemes may be used as well.

In embodiments a server, a virtual server, a servlet, and other systems may be used in embodiments. A server resource may be specialized to detect when a first part of a form is submitted and then, using session information or other sources of information, may look up a POST request, or other call type, for information needed to populate an unpopulated part of the electronic form. When the fields necessary to submit the form are gathered, or another threshold is met, the form fields and the form itself may be aggregated for submission. Thus, session information, stored data, and retrieved data may be selectively gathered, without subsequent user input, to complete or finalize the form prior to its submission. In embodiments, a validation of the form, or the fields within it, or security features of the form itself, may be undertaken prior to the submission of the form. This validation may be undertaken for various reasons, including to confirm the completion of the form and to validate the accuracy of the populated data.

In embodiments, additional validation of partially completed forms, as well as validation of the aggregated data, may also be completed. This validation may be completed on the server side, at a client, and elsewhere. The validation can include validation of the populated data as well as verification if certain fields should or should not be populated. For example, if a customer service representative user request contains form data for a customer's credit card number, this credit-card information can be discarded, or an error message returned, asking the customer service representative to re-submit. Also, if both users have write-access to a field, and send different data, a server resource or other resource can intelligently determine which piece of data to discard as well as to return error messages to one or both parties. When a web-client is being utilized, for example, the client may store user input in session data and provide this data to a different web-client being used by a second user, who is also interested in completing the form.

FIG. 1 shows an electronic multi-source form 100 as may be populated in accord with embodiments of the invention. The multi-source form 100 may contain various fields, flags, constructs, and metadata. The form may contain other information as well. Form flags 121-126 are shown. These flags may serve to identify the level of confidentiality of the form, the number of users needed to complete the form 100, the source of information for the form 100, and other management style information regarding the form. The flags may provide real-time alerts as to the status of the form and the fields therein, providing alerts if conflicting data is provided, a user is seeking to improperly populate a field, and for other reasons as well. The flags may also alert a user of the form 100 that the user has limited or designated access to certain fields of the form 100. This access may include access to view as well as to edit. The flags may also indicate that certain fields have been masked or concealed and whether these masked or concealed fields have been populated or remain to be populated.

Other items of the form 100 include the multi-source fields 130 and the single source fields 140. Consistent with their names, the multi-source fields may be completed by multiple sources including various users and various data sources, including local and remote data sources. The single-source fields may each be completed by only a single source, e.g., a user, or remote database, or real-time user data. The fields, however, need not all be completed by the same source. Thus, the first field in the single-source fields 140 may only be populated by a customer while the second field in the single-source fields 140 may only be populated by a customer service representative. Once populated, or at some designated mid-point, the form may be submitted, stored, and retrieved for subsequent population, or for other actions as well.

The fields may be competed in various computing environments including locally, on individual clients, over shared networks, and over virtual-private-networks as well. Likewise various programming schemes may be used to carry out embodiments. This may include preparing JVMs, JSPs, and servlets, as well as in non-Java environments.

Fields in the form can be configured to allow different users to have different access rights or different read rights to those fields. Moreover the fields may be completely or partially blanked so that information filled into the fields by one user may not be viewable or accessible to another user. These restrictions may be user-based, time-based, and have other limiting criteria as well. An example of time-based restrictions include calendar events and user specific thresholds, e.g., time since logging on and security clearances that expire in a certain amount of minutes, days, weeks, etc.

In embodiments, session information may be used for the presentation, receipt, confirmation, and acknowledgement of the fields in the form. In embodiments, a session may first be set up such that login and other setup information is gathered. This session set up may include opening appropriate applications and establishing user parameters and access criteria based on previously stored data. During the session, session management may include controlling the presentation of a form to a user, receiving information to populate fields from the user, confirming the information from the user, acknowledging the receipt of the information and submitting the completed form.

As fields of data are populated, the session may manage which users have access to or can see the field data. In embodiments, the session data can serve to conceal fields from a second user when the first user is populating fields in the form.

In embodiments, a catalog servlet may be used to track session information and to provide error page warnings. Past sessions may also be evaluated, and updated as needed with new form information. When past sessions are reloaded, the security permission of the user may be considered to conceal fields that may be displayed to the user during the subsequent session. These concealment settings may be the same, similar to or different than the concealments settings used earlier on the form and its fields. This change in settings may be because a different user is viewing or working with the fields or because a certain time has passed, because the confidentiality status of the user has changed, and for other reasons as well. In embodiments the catalog servlet may also store and provide user snapins such that forms may be automatically populated with information for a certain user. Here, the user may have earlier provided and stored various confidential information and then this information may be recalled and used to populate addition form fields from the catalog servlet at the request of the user. In addition to servlets, threads, applets, pointers and channels may also be used in embodiments.

In embodiments, forms may be submitted by only one of the two users. In other words, as information is filled in from multiple users, at different browser or entry locations, the information may only be retained at one of the uses locations or an alternative location such that only one user may control the final submission of the completed form. An example of this type of tool completed may include a mortgage application where public information such as address and formal name may be available while social security income place of employment and other more confidential data may have limited or no access to others who are completing portions of the form. For example, the mortgage broker may not have direct access to the social security number or employer of an applicant, but a recipient of the completed form may gain full access to the form in order to perform the necessary underwriting functions of a mortgage banker.

The fields and forms may also be populated and completed at different times and merged by a server or other system, once each user has filled out the requisite portions of the form. When the form is completely populated by the users, the system may be notified that the form has been completed properly, needs additional information, and/or has been submitted to the proper recipient.

In embodiments, data populated by a user may be forwarded to another location or another user for subsequent completion of the form. Responses may then be sent back to users after data is considered, to notify the user that certain fields have not been completed properly or certain information is missing. Still further, complicating information or inconsistent information may have been provided by users, again prompting a notification or identification of the conflict and requesting subsequent information and/or confirmation to confirm the identify conflict change the data or proceed forward. Thus, user data may be gathered at different times, retained, and used subsequent to receipt to populate and complete forms.

Figure 2:
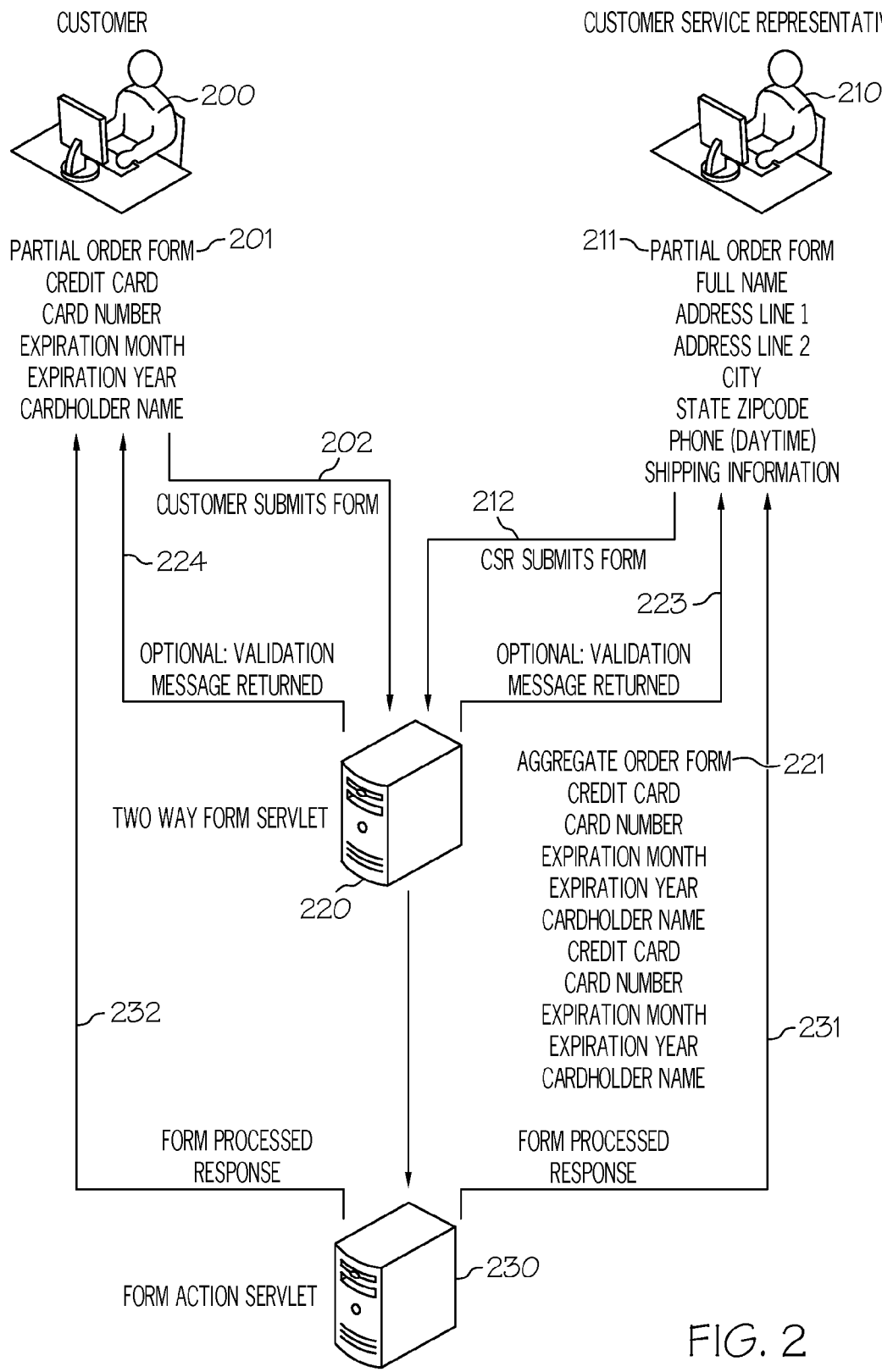
FIG. 2 shows a flow chart involving two users populating fields, with certain fields populated by one user being concealed from the other user.

FIG. 2 shows embodiments of the invention is use. FIG. 2 shows a customer or user 200, a customer service representative or user 210, forms 201 and 211, and servlets 220 and 230. As shown in FIG. 2, the user 200 may complete or provide partial data 201 for the fields of the form. Likewise, the user 210 may also provide partial data 211 in the fields of the form. The data entries 201 and 211 may be sent to a form servlet 220 that may then respond to each user. These responses are shown at 223 and 224. The responses may include notice that the fields have been received and verified.

The two-way form servlet 220 may aggregate the form with the data 201 and 211 and then send a completed form to the form-action servlet 230. This action servlet 230 may itself send notification to both users 200 and 210 that the form has been properly assembled and that the form action servlet has received the assembled for subsequent action as well as forwarding.

After aggregating and validating the data, the server resource 230 can then process the form and return the responses as well as initiate a request to the standard form processing server resource to finish the request and response. The server resource 230 may take other steps as well.

In use, a user trying to complete an auto quote is one of various contemplated uses that may be escalated to a Customer Service Representative (CSR) who may help complete the quote. The CSR can fill out pieces of the form and may provide information from other databases, the CSR may perform other tasks as well. The CSR may not see some of the confidential or all of the confidential information when he or she is providing assistance. In embodiments, the CSR may complete a small piece of the form, logout of the session, and provide notice to the user that the user should complete the form or complete a portion of it and provided notice back to the CSR to complete the form for submission. Data may be blocked out or shielded from the CSR such that the CSR doesn't see the confidential nature of the data.

Still further, as with all of the above, embodiments may also have the CSR being selected according to session information, having been previously linked to the session or having certain expertise and the type of session involved. The CSR may be selected for other reasons as well.

In embodiments, sessions of each of the users may be linked to share and complete form data. In other words once one session is initiated to a form, a query to identify related or identical sessions elsewhere on this or other servers may be conducted. Session data may be linked and form data may be shared as is needed to complete forms consistent with embodiments of the invention. Session information may also be used for other purposes as well. For example the session information may be used to identify peers in a group needed to complete form in formation. The session information may also be used to retrieve archived form information and order to blank out certain fields of forms being completed. Still further, identifications in the session information may be used or considered when determining when to submit forms. Also, session information may be used to identify related forms or related form data submitted after an initial session and form completion has begun. Applicable session information may be stored on the client browser, on a server, or on other locations as well.

There may be both volatile storage and nonvolatile storage of the session and session information. POST requests, which serve to push information back to the server, may be used in embodiments. The implementation may be two-way or a multi-person completion form. In embodiments, the two-way form may be completed by redirecting information to and from the original servlet creating the form.

Figure 3A:
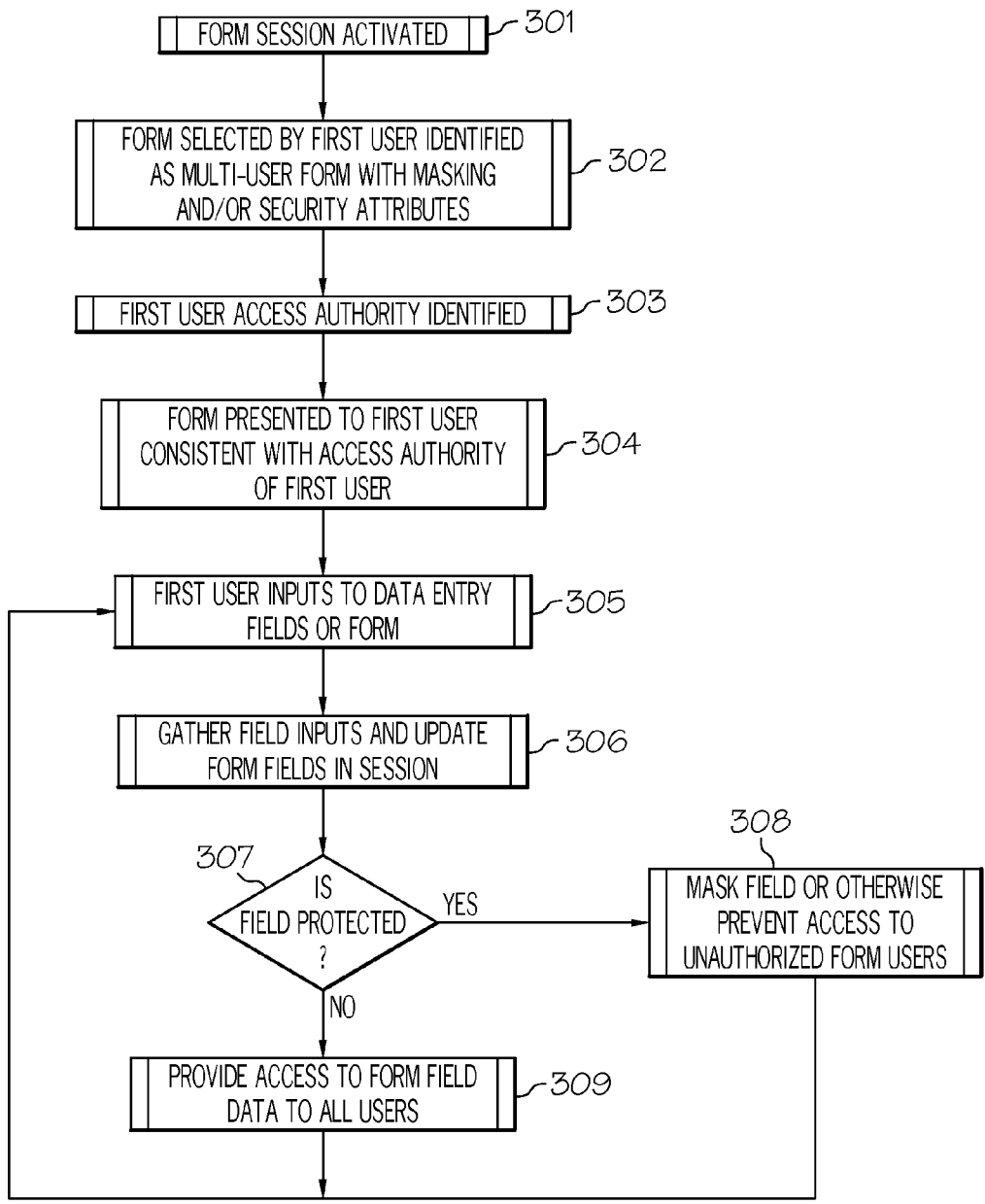
FIG. 3A shows a method that may be employed by a user populating a field.
Figure 3B:
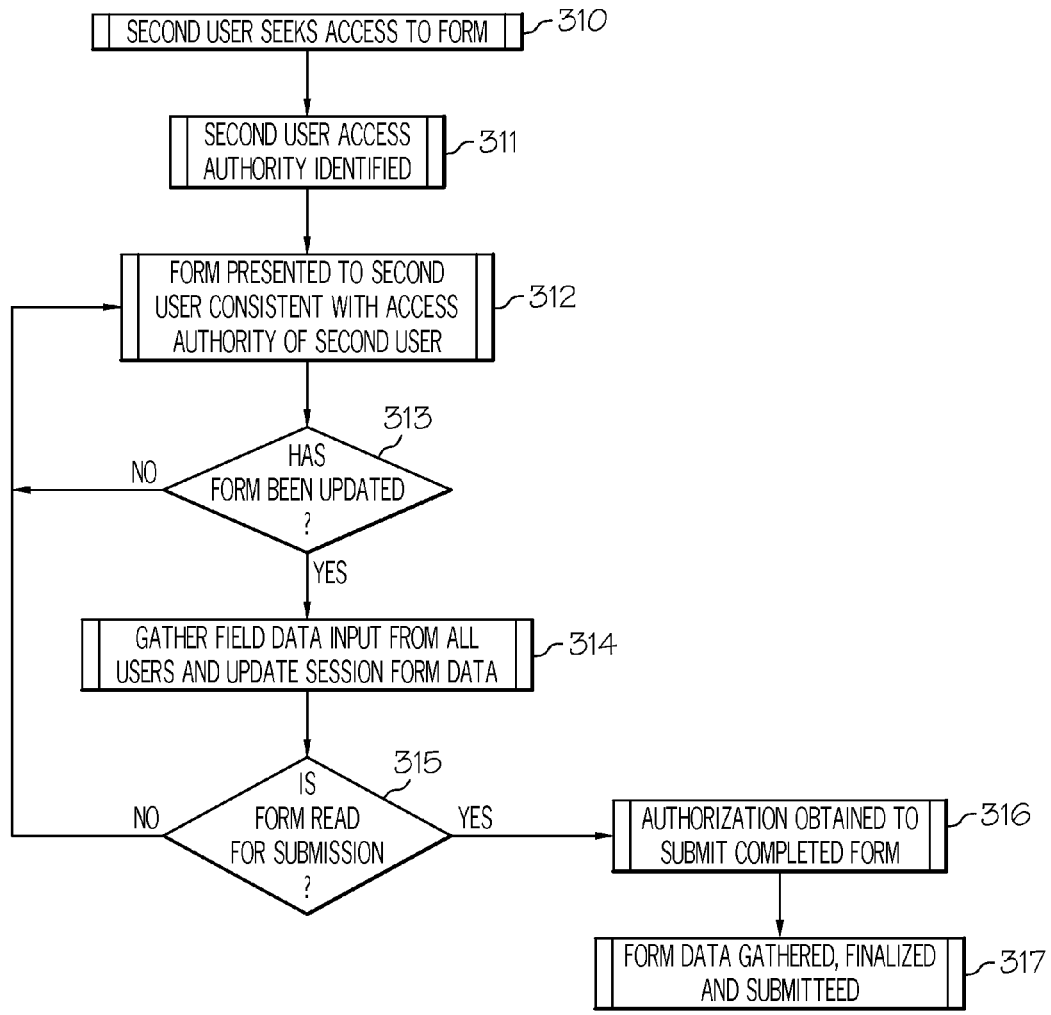
FIG. 3B shows a method that may be employed by a user accessing and submitting a form previously populated, where some fields are concealed from the user.

FIGS. 3A and 3B show methods that may be employed in embodiments. The disclosed actions in these methods may be performed in the order disclosed as well as in other orders as well. Other actions may also be included and actions described therein may be excluded in embodiments. At 301, a form session may be initiated at a server or client. The session may be initiated to include various applications as well as one or more users of the embodiments described herein. At 302, a user may select a form to be completed or filled in. The form selected may be identified as a multi-user for with certain fields or attributes that are not to be shared. Session information may be stored to identify the form, its classification, the user and other information as well. At 303, the identity as well as the authority of a first user may be identified or confirmed and this information stored with session information. At 304, the form to be completed may be presented to the first user and the first user may begin to populate fields as shown at 305. If the field is a protected field, session information may be stored to limit access to that field to others in the session. Likewise, metadata may be retained in the form to limit access to that field for subsequent users or viewers of the form. If the field is not protected, then that field may be viewed and populated by various or unrestricted users. User entry may continue in this loop, as shown by the arrows leading from 308 and 309 to 305. Metadata may be used for other reasons as well.

At 310, a second user may seek to access the form or fields of the form. The access for the second user may include verifying session information, confirming passwords entered by the user and using other security tests as well. The form may be presented to the second user to complete the absent field, as well as for other reasons. These other reasons may include the approval of the form and the verification of non-concealed fields. If the form has not been updated it may be represented to the second user as shown at 313 and the second user may facilitate submitting the form as shown at 314. If the form has been updated, the updates may be gathered and session data and metadata for the form may both be updated, as shown at 314. Once the form is ready for submission, authorization for submission may be obtained, as shown at 316. Prior to form submission, data from various users, and data sources may be gathered and finalized, as shown at 317.

In this and other embodiments, the users may be accessing the form concurrently as well as at different times. Also, the users may be accessing the form and populating the fields with the same client, different clients, across the same network and across different networks.

Figure 4:
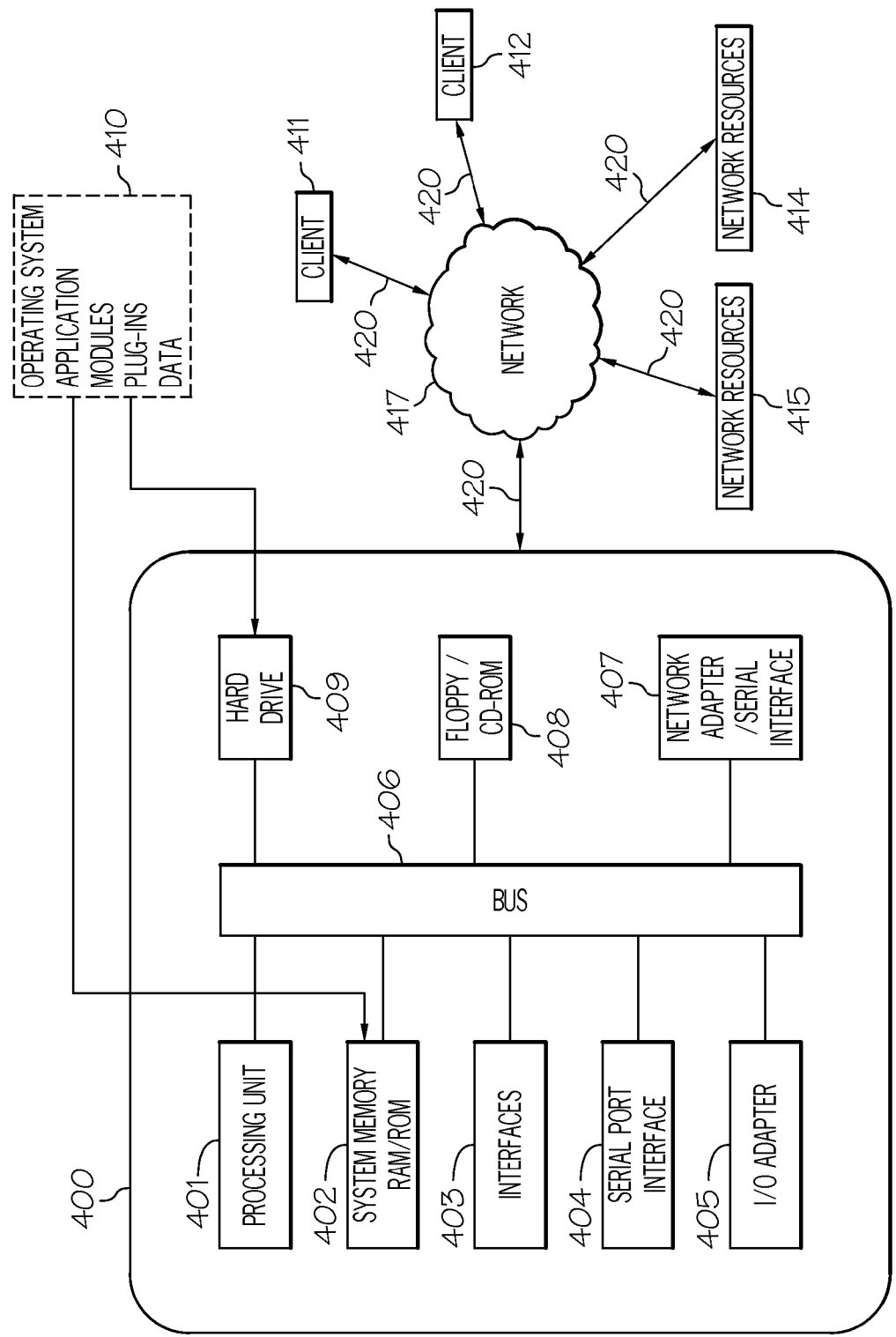
FIG. 4 shows a network with various apparatus that may be used.

FIG. 4 shows an embodiment of a system that may employ embodiments of the invention. This system may include a network 417, network resources 414 and 415, clients 411 and 412 and a processor 400. The network resources may be servers performing various functions including information storage, security encryption, and application service. The clients 411 and 412 may be running on the same platform as well as on different platforms. The clients may store session information locally as well as across the network on the various resources 414 and 415.

The processor 400 may include a processing unit 401, system memory 402, interfaces 403, serial port interfaces 404, an I/O adapter 405, a hard drive 409, CD-ROM 408, a bus 406, and a network adapter/serial interface 407. The operating code carrying out the operations of the processor may be stored on the hard drive 409 and the RAM/ROM 402. This code may include language to carryout embodiments of the invention. The processor 400 may also be resident within clients 411 and 412 as well as within resources 414 and 415.

While it is understood that the process software embodying the invention may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. A method comprising:
   displaying a multi-user form to a first user, the multi-user form having a plurality of fields, some of the fields having a first confidentiality designation and some of the fields having a second confidentiality designation;
   receiving population data for one or more fields from a first user;
   populating one or more fields using the received first user population data;
   determining if a populated field has the first confidentiality designation or a different confidentiality designation;
   based on the determination, displaying fields, with population data from the first user, to a second user after determining, if the second user has authority to access populated fields having the determined confidentiality designation;
   identifying the authority to access confidential designations of a first user;
   identifying the authority to access confidential designation of a second user;
   using session information from the first user and session information from the second user to identify peers in a group necessary to complete form information;
   and
   providing a real-time alert flag on the form visible to a user that the user is seeking to improperly populate a field of the multi-user form.

2. The method of claim 1 further comprising:
   receiving population data for one or more fields from the second user; and
   populating one or more fields using the received second user population data.

3. The method of claim 1 further comprising:
   querying session data to determine if the second user has authority to access populated fields having the determined confidentiality designation.

4. The method of claim 1 further comprising:
   querying a network resource for data associated with the first user; and
   populating one or more fields of the fields of the form with data received from the network resource in response to the query.

5. The method of claim 1, wherein, the first user is a customer providing populated data using a client application and the second user is a customer service representative.

6. The method of claim 1 further comprising:
   submitting a multi-user form after populating fields with population data from the first user and from the second user.

7. The method of claim 6, wherein the submission and the population of fields occurs in real-time, with the first user and the second user populating fields during a joint session.

8. The method of claim 1 further comprising:
   using a catalog servlet to track session information and to provide an error warning that a user is seeking to improperly populate a field.

9. The method of claim 1 further comprising:
   evaluating past sessions and updating form fields of past sessions with new form information.

10. The method of claim 1 wherein the authority of the second user changes based on the amount of time since the second user has logged on.

11. The method of claim 1 further comprising:
receiving population data for one or more fields form the second user, discarding the received population data from the second user or returning an error message to the second user asking the second user to re-submit form field data.

12. The method of claim 1 further comprising:
sharing user input session data from a web-client of the first user to a web-client of the second user for use by the second user to complete the form.

13. The method of claim 1 further comprising:
indicating with a flag that one or more form fields has been concealed and whether or not the concealed field remains to be populated.

14. The method of claim 1 wherein the authority of the second user expires in a certain amount of time.

15. A method comprising:
displaying a multi-user form to a first user, the multi-user form having a plurality of fields, some of the fields having a first confidentiality designation and some of the fields having a second confidentiality designation;
receiving population data for one or more fields from a first user;
populating one or more fields using the received first user population data;
determining if a populated field has the first confidentiality designation or a different confidentiality designation;
based on the determination, displaying fields, with population data from the first user, to a second user after determining, if the second user has authority to access populated fields having the determined confidentiality designation;
identifying the authority to access confidential designations of a first user;
identifying the authority to access confidential designation of a second user; and
using session information from the first user and session information from the second user to identify peers in a group necessary to complete form information.

* * * * *